United States Patent [19]

McCormick

[11] 4,009,509
[45] Mar. 1, 1977

[54] CABLE TIES

[75] Inventor: Mathew McCormick, East Didsbury, England

[73] Assignee: Bowthorp Hellerman Limited, Crawley, England

[22] Filed: Mar. 13, 1975

[21] Appl. No.: 558,004

[30] Foreign Application Priority Data

Mar. 12, 1974 United Kingdom ............ 11004/74
Nov. 20, 1974 United Kingdom ............ 50373/74

[52] U.S. Cl. ............................................ 24/16 PB
[51] Int. Cl.² ........................................ B65D 63/00
[58] Field of Search ......... 24/16 PB; 292/318, 320, 292/322

[56] References Cited

UNITED STATES PATENTS

| 3,605,199 | 9/1971 | Eberhardt | 24/16 PB |
| 3,660,869 | 5/1972 | Caveney et al. | 24/16 PB |
| 3,731,347 | 5/1973 | Caveney et al. | 24/16 PB |
| 3,735,448 | 5/1973 | Waddington | 24/16 PB |
| 3,906,593 | 9/1975 | Caveney et al. | 24/16 PB |

Primary Examiner—Kenneth Downey
Attorney, Agent, or Firm—Lawrence E. Laubscher

[57] ABSTRACT

A cable tie is moulded in one piece and comprises an elongate flexible strap provided with ratchet serrations on one side and a head at one end of the strap, the head having an aperture provided with a pivoted pawl having teeth which engage the ratchet serrations of the strap when the free end of the strap is passed through the aperture. The pawl teeth have their crests in a common plane, in the moulded condition of the tie, which lies substantially perpendicular to the plane of the strap. The aperture is formed opposite the pawl with an abutment surface which is inclined to the common plane of the pawl teeth so that the pawl tooth furthest from the pawl pivot is closest to the abutment surface.

5 Claims, 6 Drawing Figures

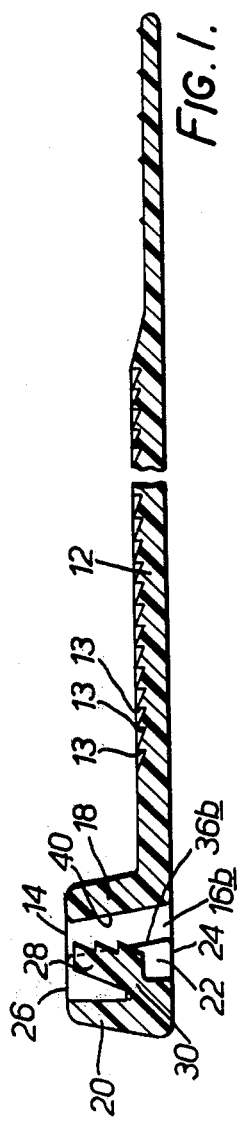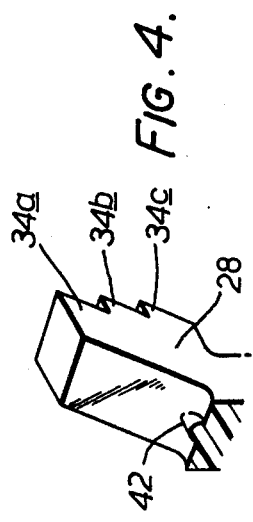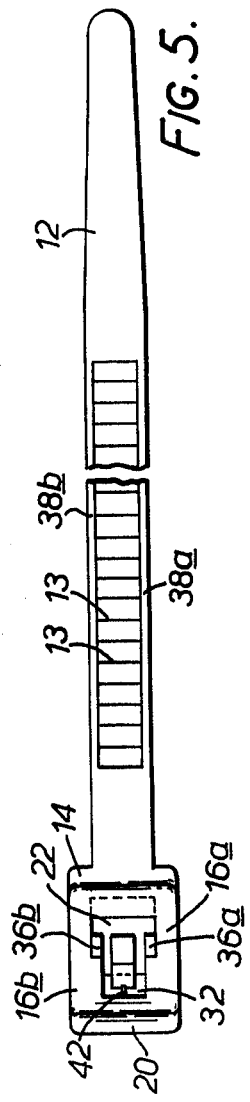

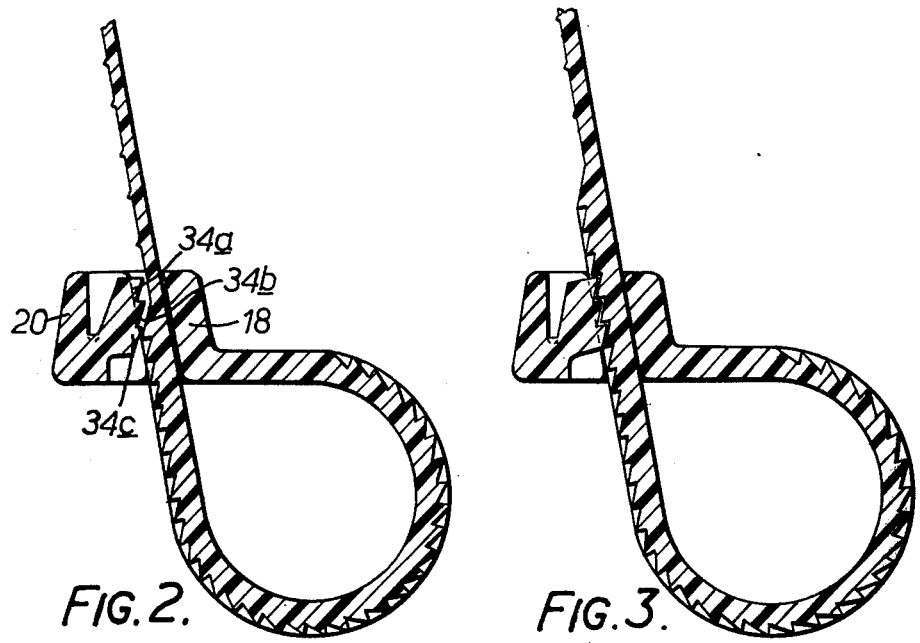
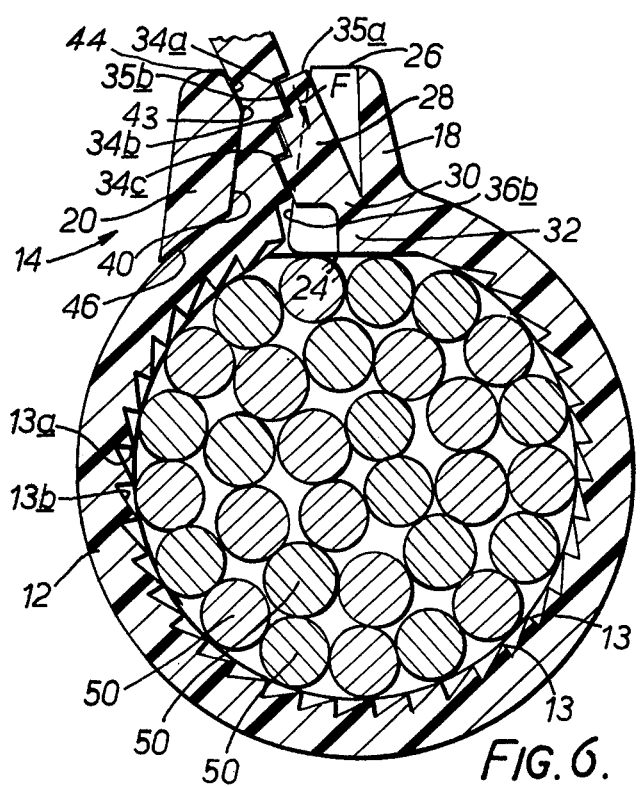

CABLE TIES

The present invention relates to a one-piece tie of synthetic plastic material for tying around a bundle of electric cables or the like.

As seen from one aspect, this invention provides a one-piece tie of synthetic plastic material, comprising a flexible elongate strap, a head at one end of the strap, an aperture extending through said head in a direction transverse to the plane of said strap, a pawl disposed within said aperture and formed with a plurality of transverse teeth having their crests in a common plane which lies, in the moulded condition of the tie, substantially perpendicular to the plane of said strap, said pawl being pivotably connected to a wall of said head for movement of said teeth in respective arcs across said aperture in the lengthwise direction of said strap, said aperture being formed opposite said pawl teeth with an abutment surface which is, in the moulded condition of the tie, inclined to said common plane of said pawl teeth so that the pawl tooth furthest from the pawl pivot lies nearest said abutment surface, and a series of transverse ratchet serrations formed on one surface of said strap, said ratchet serrations and pawl teeth being profiled so as to co-operate and permit passage of the free end of said strap through said aperture from the pivoted end of said pawl but so as to prevent subsequent withdrawal of said strap in the opposite direction, any tension applied to said strap in said opposite direction serving to pivot said pawl to firmly grip said strap flat against said abutment surface.

In use, the strap is looped around a bundle of electric cables or the like and the free end of the strap is pulled through the aperture in the head and tightened around the bundle under considerable tension before the free end of the strap is released. Upon release, the back-tension in the strap serves to pivot the pawl towards the abutment surface to grip the strap flat against the abutment surface.

Conveniently, the arrangement is such that with said strap passed through said aperture to lie flat against said abutment surface with the pawl teeth fully engaged with respective ones of said ratchet serrations and with no tension applied to said strap, said pawl lies in a position pivoted away from its moulded position so that the common plane of the crests of the pawl teeth lies parallel to the abutment surface. With this arrangement, the back-tension which becomes effective in the strap, upon releasing the tightening force, serves to swing the pawl round towards its moulded position, the plastics material of the head stretching and compressing in different regions in order to accommodate this.

The tie is able to withstand higher back-tension, before failure of the ratchet-and-pawl interlock, than if the abutment surface had been perpendicular to the as-moulded plane of the strap, instead of inclined to that plane. This is particularly so in a tie having the pawl pivoted to the end wall of the head remote from the strap so that the serrations on the strap face outwardly when the tie is tied. This is because, in a tie having the perpendicular abutment surface, when the strap is tied around a bundle the strap enters the head at an angle such as to exert a force, on the pawl tooth nearest the strap entry, tending to force the pawl away from engagement with the strap. The situation is worse in such a tie having an outward extension on the head, this extension being apertured for fixing the head of the tie to a mounting panel: users of these ties have a natural tendency to test the security of the tie when tied by levering the head on its extension in a direction which causes considerably higher back-tension to be placed on the strap.

Also, a marked improvement in the strength of the tie against back-tension is found in the ties with inclined abutment surface in which the pawl is connected to the end wall of the head adjacent the strap, so that the strap serrations face the bundle around which the tie is tied.

Preferably, the abutment surface is inclined at substantially 10° to the common plane of the pawl teeth crests in the moulded condition of the tie.

Preferably, the head is formed within said aperture with a pair of guiding abutments disposed on opposite lateral sides of said pawl and facing and parallel to said abutment surface to define, with said abutment surface, a channel, parallel to said abutment surface, for the passage of the free end of said strap through said aperture.

Preferably, each said pawl tooth comprises a first surface facing the pawl pivot end of said aperture and a second surface facing the opposite end of said aperture, said first and second surfaces intersecting to define the tooth crest and both being inclined to said common plane of teeth crests, said first and second surfaces inclining away from said abutment surface towards the opposite ends of said aperture in respective directions away from said crest, and each said strap serration comprising a complementarily inclined pair of surfaces. Thus, when the strap is inserted through the aperture and back-tension is applied to the strap, that surface of each pawl tooth which faces away from the pawl pivot is abutted by a corresponding surface of an engaged strap serration and is subjected to a force which is inclined to the common plane of the pawl teeth in a direction towards the pawl pivot.

Preferably the pawl tooth furthest from the pawl pivot comprises a said second surface lying substantially perpendicular to a radius through said pivot, whereby to experience a force, from an engaged strap serration, in a direction passing substantially through the pawl pivot, under back-tension in the strap. Because the force on each pawl tooth is inclined to the common plane of the pawl teeth in a direction towards the pawl pivot, instead of in a direction parallel to the common plane of the pawl teeth, the risk is reduced of the pawl being sheared away from the head (at the pivot point) upon the application of excessive back-tension in the strap.

Preferably a transverse ridge is formed at an intersection between the abutment surface and a further surface inclined to the abutment surface in a direction away from the pawl, this ridge lying closer to the plane of the strap than the crest of the pawl tooth which is furthest from the pawl pivot. Then, under the effect of back-tension in the strap, the pawl bends the strap over the ridge and the ridge bites into the strap. This is found to improve the lock between the pawl teeth and strap serrations.

As seen from a second aspect, this invention provides a one-piece tie of synthetic plastic material, comprising a flexible elongate strap, a head at one end of the strap, an aperture extending through said head in a direction transverse to the plane of said strap, a pawl disposed within said aperture and formed with at least one transverse tooth, said pawl being pivotably connected to a wall of said head for movement of said pawl tooth in an arc across said aperture in the lengthwise direction of said strap, at least one rib extending from said pawl to said wall of said aperture across the junction of said pawl with said wall, an abutment surface formed opposite said pawl tooth and a series of transverse ratchet serrations formed on one surface of said strap, said ratchet serrations and pawl tooth being profiled so as to cooperate and permit passage of the free end of said strap through said aperture from the pivoted end of said pawl but so as to prevent subsequent withdrawal of said strap in the opposite direction, any tension applied to said strap in said opposite direction serving to pivot said pawl to firmly grip said strap flat against said abutment surface.

The rib formed across the junction of the pawl with the wall of the head prevents the pawl being sheared off through shock, for example if the tie is laid flat upon a hard surface, the strap held down, the head lifted and then released to move towards the hard surface under the resilience of the plastics material, so as to strike the hard surface. This is found to be a problem in ties not formed with the rib, especially in cold climates where the synthetic plastic material, preferably nylon, is more bittle. In such climates the pawl, in the absence of the rib, is liable to be sheared off merely upon insertion of the strap into the head aperture. Provision of the rib enables the thickness of material at the pawl pivot to be reduced to render to pivot more flexible, whilst the rib prevents the pawl being sheared off upon insertion of the strap into the head aperture. Two or three parallel ribs may be provided instead of a single rib.

Embodiments of this invention will now be described, by way of examples only, with reference to the accompanying drawings, in which:

FIG. 1 is a longitudinal section through one embodiment of a one-piece tie shown in its moulded condition;

FIG. 2 is a similar section through the same tie, shown with the strap of the tie looped and with the free end of the strap inserted through the head aperture to the point where the first strap serration is about to contact the first tooth on the pawl;

FIG. 3 is a similar section through the same tie, showing the strap pulled through the head until all pawl teeth fully engage respective strap serrations (but with no back-tension applied);

FIG. 4 is a perspective view of the pawl of the same tie;

FIG. 5 is a plan view of the same tie; and

FIG. 6 is a longitudinal section through a second embodiment of a one-piece tie, shown tied tightly around a bundle of cables and with back-tension in the strap serving to pivot the pawl against the strap.

Referring specifically to FIGS. 1 and 5 of the drawings, there is shown one embodiment of a one-piece tie of synthetic plastic material comprising a flexible elongate strap 12 provided with a series of transverse ratchet serrations 13 on one side thereof and a rectangular head 14 at one end thereof. The head 14 comprises a pair of side walls 16a, 16b and inner and outer end walls, 18, 20; these four walls encompass an aperture 22 which extends through the head 14, from an entry surface 24 to an exit surface 26 thereof, generally transverse to the plane of the strap. A pawl 28 is disposed within the aperture 22 and extends through a reduced neck portion 30 from an upper horizontal surface of a ledge 32 disposed on the outer end wall 20 of the head and extending the full width of the aperture 22 to merge with the opposite side walls. The pawl is pivotable about the neck portion 30.

The pawl is provided with three teeth 34a, 34b, 34c, for engagement with the serrations 13 on the strap when the free end of the strap is passed through aperture 22 to tie the tie, each pawl tooth being spaced from the pivot region 30 in a direction towards the exit surface 26 and each projecting towards the inner end wall 18. Although three teeth are shown, a greater number, or even two teeth may by provided but the crests of the teeth lie in a common plane which lies, in the moulded condition of the tie, substantially perpendicular to the plane of the strap.

The head 14 is further provided with a pair of guiding abutments, 36a, 36b one on each side wall of the head, for marginal plain portions 38a, 38b of the strap to run upon when being pulled through the head. In this connection, the width of the aperture 22, between the opposite side walls, is slightly greater than the overall width of the strap 12, whilst the width of the serrations 13 across the strap is greater than the width of the pawl but less than the transverse distance between the two abutments 36a, 26b. The abutments 36a, 36b are parallel to but spaced from an inclined abutment surface 40 of the inner end wall by a distance slightly greater than the thickness of the strap 12 to define a channel through the head which is inclined, in the moulded condition of the tie, to the common plane of pawl teeth crests, preferably at an inclination of substantially 10°. The pawl tooth 34a furthest from the pivot 30 is accordingly closest to the abutment surface 40. The pawl teeth 34a, 34b, 34c project beyond the guiding abutments towards the abutment surface 40, so that they will engage with the strap serrations when the tie is tied.

A single rib 42 is shown, see particularly FIG. 4, and this runs across the neck portion 30 from the pawl to the outer end wall 20 on the side of the pawl remote from the pawl teeth. Instead of a single rib 42, two or three parallel ribs may be provided.

The tie is manufactured by injection moulding using two dies defining a mould cavity and separable in a straight line perpendicular to the plane of the strap. The pawl teeth are formed by that die which leaves the head at the exit surface 26 thereof, that die camming against the pawl teeth to pivot the pawl slightly in the counter-clockwise direction (as viewed in FIG. 1) to permit removal thereof.

A description will now be given, with reference to FIGS. 2 and 3, of the tying around a bundle of cables of the cable tie shown in FIGS. 1 and 2. The strap 12 is looped around the bundle of cables (not shown) to be tied and the free end thereof is passed through the aperture 22 from the entry surface 24. Tension is then applied to the strap to pull it through aperture 22 and tight around the bundle of cables. As the strap is pulled through the aperture 22, the successive serrations 13 on the strap ride over the pawl teeth, causing the pawl 28 to pivot away from the strap to accommodate the linear movement thereof. When the tensioning force is removed from the free end of the strap, back-tension within the looped portion thereof causes the strap to move slightly in the withdrawal direction. The serrations 13 accordingly lock with the pawl teeth and the back-tension serves to pivot the pawl 28 so as to grip the strap flat against the abutment surface 40. Increasing back-tension serves to increase this pivoting of the pawl and more firmly grip the strap against the abutment surface 40.

FIG. 3 shows the position of the pawl 28 wherein the pawl teeth are fully engaged with the ratchet serrations but no back-tension is applied. In this position, the common plane of the pawl teeth crests lies in a plane parallel to the abutment surface 40. In the event of back-tension being applied to the strap in the withdrawal direction, the pawl will be caused to pivot slightly towards its as-moulded position which is shown in FIG. 1.

Referring now to FIG. 6 of the drawings, there is shown a second embodiment of a one-piece tie, shown tied tightly around a bundle of cables 50. The parts of this tie which correspond with like-parts of the tie of FIGS. 1 to 5 are given like-reference numerals as the reference numerals in FIGS. 1 to 5 and the tie is manufactured in a like-manner. In FIG. 6, the pawl 28 extends through the reduced neck portion 30 from the upper surface of the ledge 32, but this ledge is disposed on the inner end wall 18 of the head instead of as is the case for the tie of FIGS. 1 to 5, on the outer end wall 20. Just as in the tie of FIGS. 1 to 5, the abutment surface 40 and the guiding abutments (of which only one — guiding abutment 26b — is shown) are inclined, in the as-mould condition, at substantially 10° to the common plane of the pawl teeth crests and this common plane is, in the as-moulded condition, substantially perpendicular to the plane of the strap.

Each pawl tooth, for example tooth 34a, is defined by two surfaces 35a, 35b inclined in opposite senses to the common plane of the pawl tooth crests. Specifically, the two surfaces 35a, 35b are mutually at right angles and the surface 35a which faces away from the pawl pivot is inclined at 22° to the plane of the strap in the as-moulded condition of the tie. Each strap serration is defined by two surfaces, for example 13a, 13b, inclined to the plane of the strap in a complementary manner to the inclinations of surfaces 35a, 35b. Accordingly, the force to which each pawl tooth is subjected by its mating strap serration, this force being normal to the surface 35a, is inclined to the common plane of the pawl teeth crests in a direction towards the pivot point. The surface 35a of the top pawl tooth is substantially perpendicular to a radius through the pivot 30 so that, as shown by the arrow F, the force upon the surface 35a of this pawl tooth passes approximately through the pivot 30.

A transverse ridge 43 is formed at a junction between the abutment surface 40 and a further surface 44 which is inclined away from the abutment surface, this ridge lying closer to the plane of the strap than the pawl tooth which is furthest from the pawl pivot 30. Under the effect of back-tension in the strap the pawl bends the strap over the ridge 43 and this ridge bites into the strap, improving the lock of the tie.

The operation of tying the tie of FIG. 6 around a bundle corresponds with the tying operation for the tie of FIGS. 1 to 5. In particular, in the condition wherein the pawl teeth are fully engaged with the ratchet serrations but no back-tension is applied, the pawl is in a position rotated clockwise from its moulded condition such that the common plane of the pawl teeth crests lies parallel to the abutment surface 40. When the back-tension is applied to the strap in the withdrawal direction, the pawl is caused to pivot towards its as-moulded position, which is the final position shown in FIG. 6.

The lower end of the outer end wall 20 of the head includes an inclined cut-away 46 permitting the strap to follow a natural line (circumferential of the bundle of cables) into the aperture.

Although in the cable tie shown in FIGS. 1 to 5 of the drawings the pawl extends from the outer end wall 20 of the head and the serrations 13 are provided on one particular side of the strap so as to face outwards from the bundle of cables when tied, alternatively the pawl may extend from the inner end wall 18 of the head with the serrations 13 provided on the opposite side of the strap so as to face the bundle when tied, as in the manner of FIG. 6. Also, although in the cable tie shown in FIG. 6 of the drawings the pawl extends from the inner end wall 18 of the head and the serrations 13 are provided on one particular side of the strap so as to face inwards towards the bundle of cables when tied, alternatively the pawl may extend from the outer end wall 20 of the head with the serrations 13 provided on the opposite side of the strap so as to face outwards from the bundle when tied, as in the manner of FIG. 6. Also, a mounting head may be provided in either embodiment by forming an outwards extension duly apertured on the outer end wall of the head.

The provision of the rib 42 (or a plurality of such ribs) in the tie of FIGS. 1 to 5 is equally applicable to the tie of FIG. 6.

In both embodiments shown, it is found that, after the tie is tied tightly around a bundle and as soon as back-tension is applied to the strap, the pawl tooth furthest from the pivot point will immediately engage with its strap serration, rather than only after the other pawl tooth or teeth have engaged with their strap serrations, and this is found to be an advantage towards ensuring a strong lock between the pawl teeth and the strap serrations.

What we claim is:
1. A one-piece cable tie formed of synthetic plastic material, comprising
   a. a flexible elongate strap including a strap portion (12), and an enlarged head portion (14) at one end of said strap portion, said head portion containing an aperture (22) of rectangular cross-sectional configuration extending generally normal to the plane of the strap portion, said aperture having opposed pairs of side and end walls;
   b. said head portion containing
      1. a pawl (28) disposed within said aperture and formed with a plurality of pawl teeth having crests which face a first one of said end walls and lie in a common plane generally perpendicular to the plane of said strap; and
      2. pivot means (30) pivotally connecting one end of said pawl with the other end wall of said aperture for movement of said pawl teeth in respective arcs across said aperture in the longitudinal direction of said strap portion;
      3. said first aperture end wall being inclined to the plane of the crests of the pawl teeth to define an abutment surface (40) which is so inclined that the pawl tooth furtherest from the pawl pivot means is nearest said inclined abutment surface; and
   c. a series of ratchet teeth (13) formed on and extending longitudinally on one surface of said strap portion, said pawl and ratchet teeth being complementary and so oriented that when the free end of the strap portion is introduced into the aperture end adjacent said pawl pivot means, said pawl and ratchet teeth cooperate to prevent removal of the strap portion from the aperture;

d. each of said pawl teeth including a first surface (35b) generally facing the pawl pivot end of said aperture, and a second surface (35a) facing the opposite end of said aperture, the second surfaces (35a) of said pawl teeth lying substantially perpendicular to a radius passing through the pawl pivot axis, thereby to direct toward the pawl pivot axis the force (F) applied to said second pawl tooth surfaces by the corresponding ratchet teeth when the strap is tensioned in the withdrawal direction.

2. The cable tie as defined in claim 1, wherein said first and second pawl tooth surfaces are inclined at an angle of about 90° relative to each other.

3. A cable tie as defined in claim 2, wherein each of said second pawl tooth surfaces (35b) is inclined at an angle of about 22° to the plane of the strap portion when in the untied condition.

4. A cable tie as defined in claim 3, and further including means (44) defining a transverse ridge (43) on said first aperture end wall intermediate said abutment surface (40) and the crest of the pawl tooth furtherest from said pivot means.

5. A cable tie as defined in claim 1, and further including at least one rib (42) extending on the side of the prawl remote from the pawl teeth longitudinally of the strap across the junction between the pawl (28) and the other aperture end wall.

* * * * *